(12) United States Patent
Hamedi et al.

(10) Patent No.: US 8,698,809 B2
(45) Date of Patent: Apr. 15, 2014

(54) CREATION AND RENDERING OF HIERARCHICAL DIGITAL MULTIMEDIA DATA

(75) Inventors: Mahiar Hamedi, Linköping (SE); Hans-Ulrik Tord Lindahl, Sysslebäck (SE)

(73) Assignee: Donya Labs AB, Linkoping (SE)

( * ) Notice: Subject to any disclaimer, the term of this patent is extended or adjusted under 35 U.S.C. 154(b) by 372 days.

(21) Appl. No.: 12/280,157

(22) PCT Filed: Mar. 5, 2007

(86) PCT No.: PCT/SE2007/000212
§ 371 (c)(1),
(2), (4) Date: Jul. 12, 2010

(87) PCT Pub. No.: WO2007/100298
PCT Pub. Date: Sep. 7, 2007

(65) Prior Publication Data
US 2010/0283787 A1      Nov. 11, 2010

(30) Foreign Application Priority Data
Mar. 3, 2006   (SE) .................................. 0600473

(51) Int. Cl.
*G06T 13/00*      (2011.01)
(52) U.S. Cl.
USPC .......................................... 345/473; 345/660
(58) Field of Classification Search
USPC .......................... 345/418–419, 428, 473, 660
See application file for complete search history.

(56) References Cited

U.S. PATENT DOCUMENTS

| | | | | |
|---|---|---|---|---|
| 5,590,248 A | * | 12/1996 | Zarge et al. | 345/421 |
| 5,896,139 A | * | 4/1999 | Strauss | 345/440 |
| 6,154,215 A | * | 11/2000 | Hopcroft et al. | 345/418 |
| 6,765,574 B1 | * | 7/2004 | Mao et al. | 345/428 |
| 6,912,293 B1 | | 6/2005 | Korobkin | |
| 7,106,328 B2 | * | 9/2006 | Royan | 345/428 |
| 2002/0163515 A1 | * | 11/2002 | Sowizral et al. | 345/419 |
| 2003/0065668 A1 | * | 4/2003 | Sowizral et al. | 707/100 |
| 2007/0159049 A1 | * | 7/2007 | Kim et al. | 313/461 |

OTHER PUBLICATIONS

Woolford, David. "Understanding and using scene graphs." COMP4201 Lectures (2003): 3-7.*
Bethel et al. 2001 Hierarchical parallelism in a scene graph. *2001 IEEE Symposium on Parallel and large-Data Visualization and Graphics*, 1-2.
Bianchini et al. 2001 Processing Directed acyclic graphs with recursive neural networks. *IEEE Transactions on Neural Networks* 12(6): whole document.
Edward, A., Interactive Computer Graphics: A top-down approach with Open GL, Addison-Wesley, 1997, sidorna 304-309, ISBN 0-201-85571-2.

* cited by examiner

*Primary Examiner* — Maurice L McDowell, Jr.
(74) *Attorney, Agent, or Firm* — Knobbe Martens Olson & Bear LLP

(57) ABSTRACT

The present invention relates to a method for the creation of large hierarchical computer graphics datasets. The method comprises combination (401) of one or more primitive computer graphics data objects (400) into larger data objects, and simplifying each of the said combined data objects (402). The simplified objects are then reused (405) in further combination steps in order to increasingly create higher order objects. The created hierarchical computer graphics data set is inherently optimized for fast rendering, and a method of rendering such data is also described.

13 Claims, 6 Drawing Sheets

CREATION AND RENDERING OF HIERARCHICAL DIGITAL MULTIMEDIA DATA

CROSS REFERENCE TO RELATED APPLICATION

This application is a U.S. National Phase application of and claims the benefit of priority to International Application No. PCT/SE2007/000212, filed Mar. 5, 2007, which designates the Unites States and was published in English and claims the benefit of priority to Swedish Application No. 0600473-3, filed Mar. 3, 2006. The disclosures of all of the aforementioned applications are hereby expressly incorporated by reference in their entirety.

TECHNICAL FIELD

The present invention relates generally to computer graphics and more specifically to an optimized method for the creation and usage of very large computer graphics data sets, optimized primarily for real-time computer graphics visualization.

BACKGROUND ART

The creation and interactive visualization of artificial computer graphics (CG) environments is an important application in the field of computer graphics. Many applications, such as CAD, architectural walkthroughs, simulations, medical visualization and computer games include interactive navigation, i.e., being able to move around a computer model/scene at greater than 10 frames per second.

A common trend within the field of interactive computer graphics is the increasing amount of CG datasets. Large CG datasets require specialized graphics systems used to accelerate the process. However, models exist that cannot be rendered at interactive speeds even with current high-end computer hardware. The development of computer hardware is not likely to solve the described problems since the size of the CG data and the size of the secondary computer memory is increasing at faster rates than the development of multimedia hardware.

In applications where the large CG datasets also have to be created, as in the case of computer games, the creation of the large datasets is an additional difficulty to the described trend. The original creation of graphics datasets is a two-step method, where in the initial stage, CG data is created in a non ordered fashion, or in a fashion that is not optimized for rendering. In a second stage, the data is ordered and optimized for rendering. This two-step method can be an inhibiting factor on the creation of large datasets, as the CG creators will not be able to interactively render the CG dataset while editing it.

Large CG datasets thus require algorithmic techniques to accelerate the creation and rendering process. Such techniques attempt to render at interactive speeds by either substituting simpler approximations for portions of the dataset or ignoring parts of it that are not used at that moment. The goal is to enable interactive CG of large CG datasets without significant degradation in final quality, or the possibility to trade quality for rendering speeds.

SUMMARY OF INVENTION

The present invention relates to a method for the creation of large hierarchical computer graphics datasets, referred to herein as the hierarchical bottom up (HBU) method.

Figure 1:
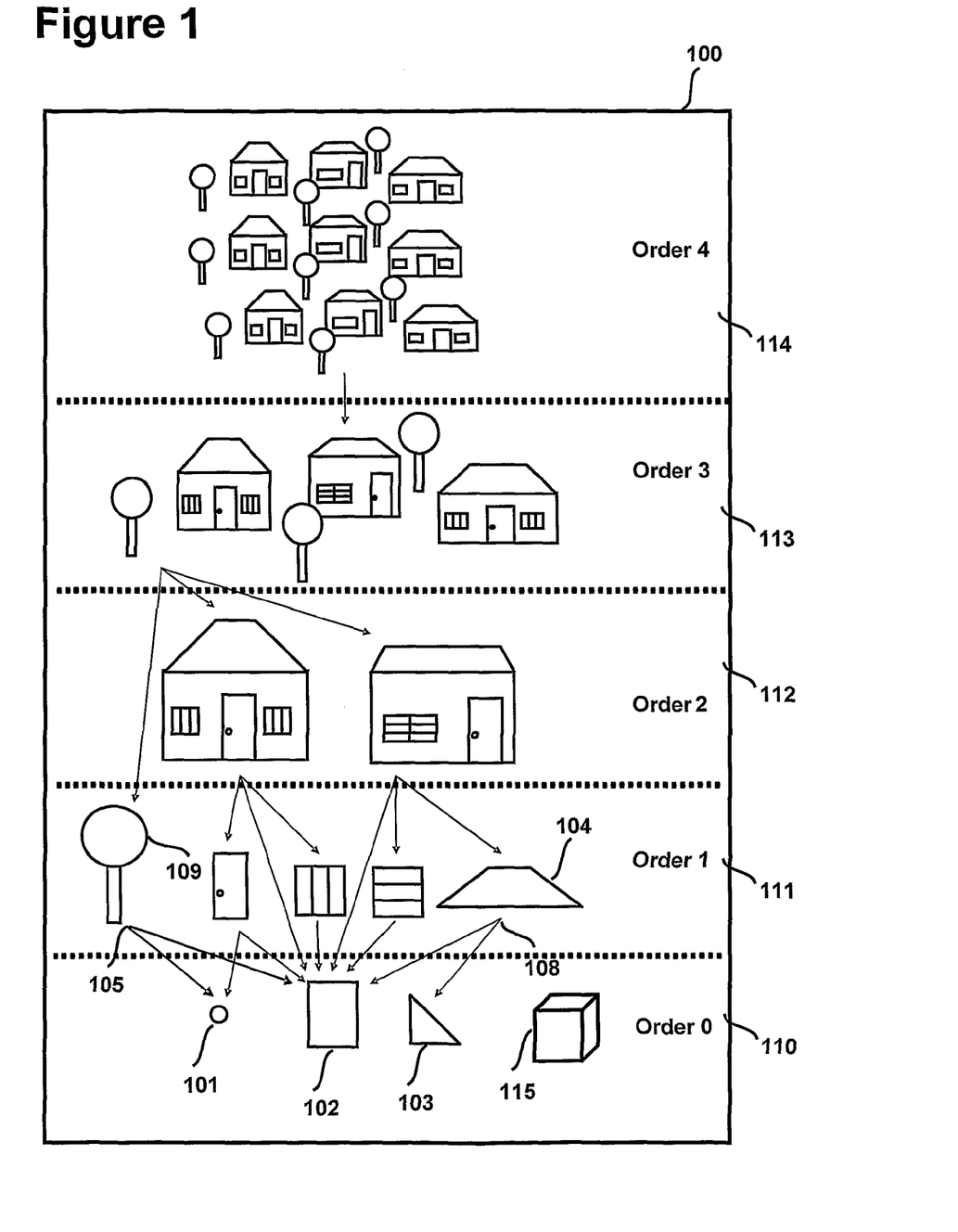
FIG. 1 is a schematic picture showing a hierarchical bottom up construction of 2D vector graphics, of house and trees.

The HBU method starts by choosing a number of CG primitives or base data objects 101, 102, 103.

The base data objects can comprise any type of data that can be used in computer graphics applications, such as raster graphics objects, vector graphics objects, bitmap images, animations, sound objects, physical properties, etc.

The base data objects are then combined 108 into new larger data objects 104, where the said combination of the data objects comprises putting together an arbitrary number of the data objects, in which each of the said data objects can be used at least one time in the combinational procedure. Each data object can also undergo arbitrary transformations in the said combination procedure, such as rotation, shearing, scaling, translation, filtering or any possible transformation possible depending on the type of the format of the object.

Figure 6:
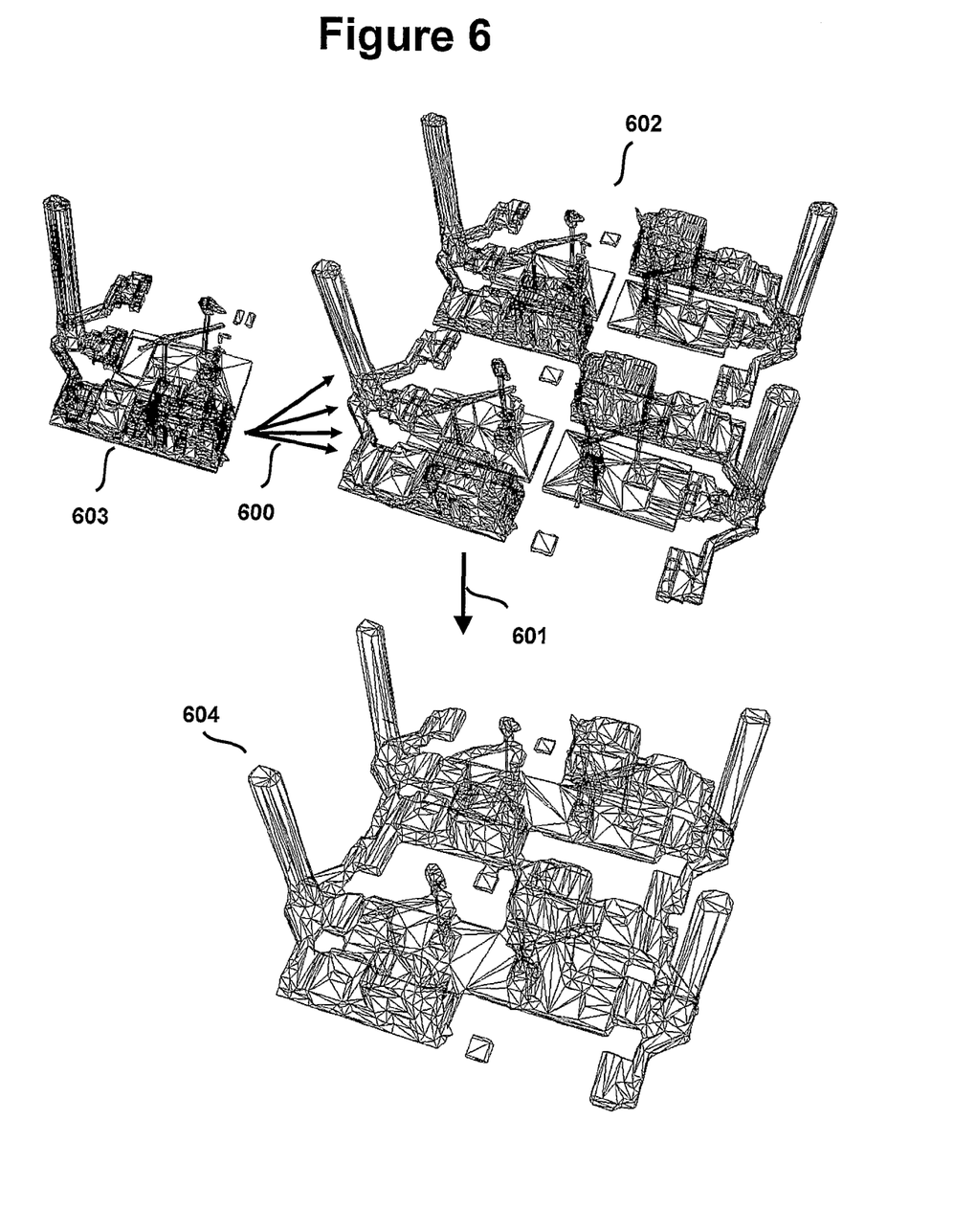
FIG. 6 is an illustration of combination and simplification of a three dimensional vector graphics object.

Each combined object is then simplified 601 automatically by appropriate computer algorithms. The first purpose of the simplification is to create simplified data that is smaller in size and consumes less storage space. The second purpose is to create data that approximates the original data object but can be rendered much faster. If the object data for example comprises 3d vector objects, then simplification of the combined 3d objects would mean that one uses vector simplification algorithms such as the algorithm disclosed in U.S. Pat. No. 5,590,248, or any other level of detail algorithm.

Figure 4:
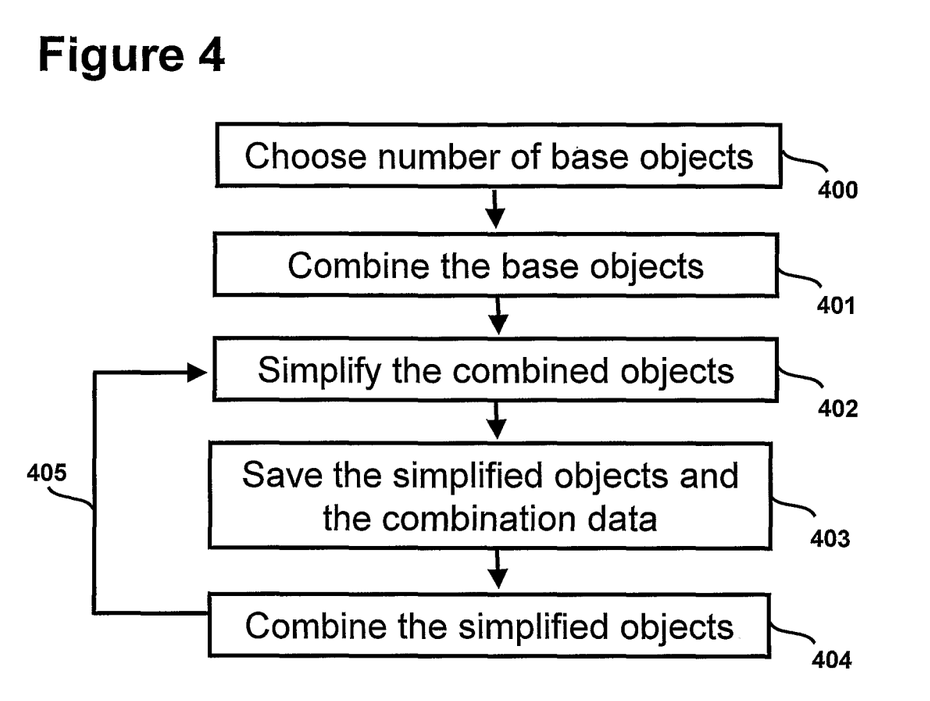
FIG. 4 is a flow diagram of a hierarchical bottom up construction.
Figure 5:
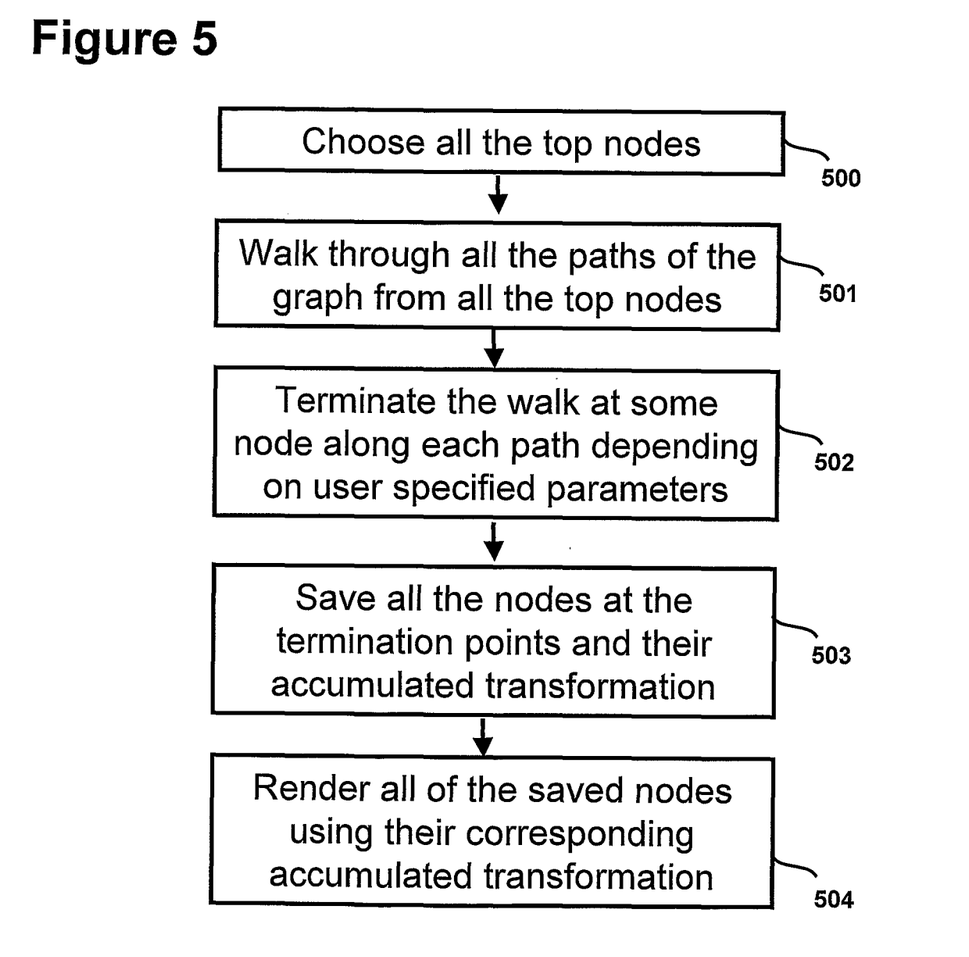
FIG. 5 is a flow diagram showing the choice of objects from a hierarchical data set for rendering.

The simplified objects are further reused 405 and can again be combined in order to create higher order structures, and the combination and simplification procedure can be repeated in a number of steps.

Through careful planning, the data size can grow linearly in size during the described hierarchical creation of data, while the apparent total size of the CG scene that the HBU data describes grows exponentially. The reason for this is that the combined larger objects are simplified in each step. This is one of the main advantages and novelties of the present invention as compared to conventional linear CG data creation methods where the size of the computer graphics dataset grows exponentially since objects are not reused and simplified. The reusing of data reduces development time considerably as the size of the content that is created grows which is a great advantage, while the hierarchical simplification prevents the size of the data from growing exponentially allowing the user to work interactively with the data throughout the entire creation process.

Figure 2:
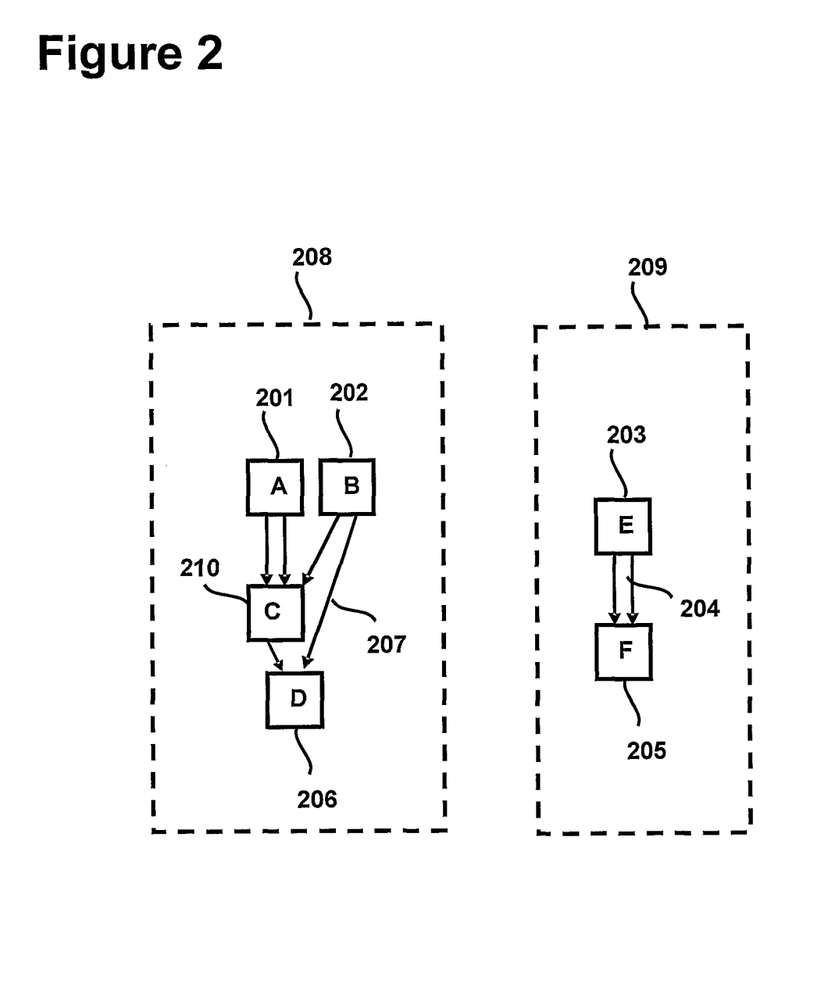
FIG. 2 is two directed acyclic graphs.

The hierarchical data structure can be stored in one or more directed acyclic graphs 208, 209 where each node 203, 205 in the graph represents and stores a unique data object that either comprise the base objects i.e., the leaf nodes of the graph 205, 206 or the hierarchically combined objects i.e., the inner nodes 201, 202, 203, 210 of the graph, and where each directed edge 207 also contains information about the transformation performed on each of the lower order nodes that the edge is pointing to.

The created hierarchical computer graphics data is optimized for further rendering. This is realized by examining a possible algorithm describing the use of the hierarchical data in rendering.

Figure 3:
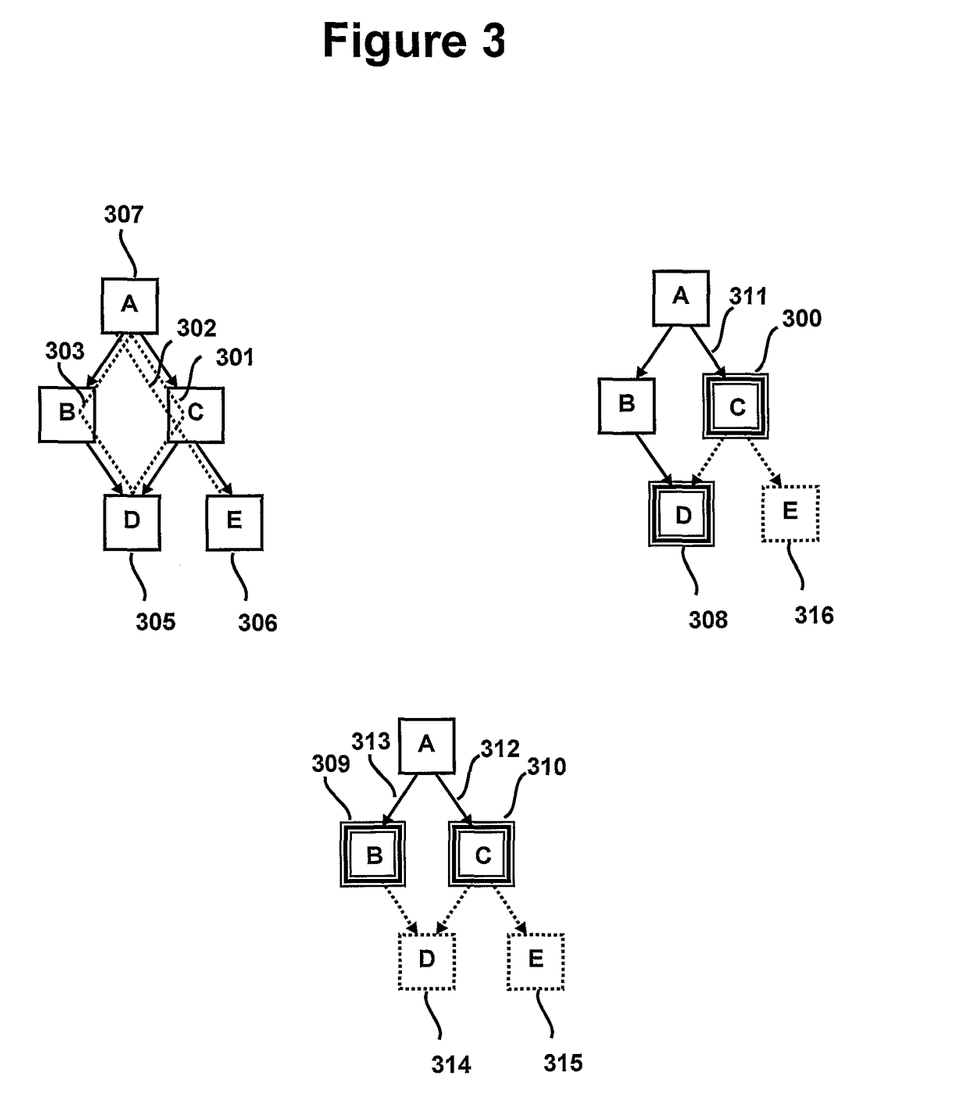
FIG. 3 is an illustration of walking of a directed acyclic graph.

A typical rendering algorithm starts by visiting the nodes recursively by going through all the possible paths 301, 302, 303 starting from all the top nodes 307. As the nodes are visited from the top node and down though each path, the path can be cut short by terminating along each path depending on some specific parameters.

All the terminated nodes along all the paths, are then chosen for rendering. For each of the chosen nodes the sum of all the transformation data along each path is chosen as the rendering transformation for the data object at that node.

This algorithm thus results in a set of nodes each with a calculated transformation. These nodes are then rendered. If the algorithm chooses nodes along a path, and that node contains sub nodes of lower order, then that means that the chosen node represents an approximation to the complete object, since it is a simplification of all the objects in the lower nodes. The choice of termination is thus based on parameters that define whether or not the approximation is good enough.

The termination could be based on parameters such as distance from the camera the actual node for 3D objects, or the incurred visible error of the said chosen node, or the amount of time available for rendering the CG data. Or any other possible parameter that is relevant in the measurement of the accuracy of the approximation during rendering of the object depending on the type of data object.

The described algorithm for choosing nodes can be carried out very quickly since it does not involve any difficult calculation steps. It is therefore possible to use the hierarchical data structure in order to dynamically create optimized rendering data in real-time which is yet another advantage and novelty of the present invention. The hierarchical data structure can also be used together with other hierarchical or non hierarchical data structures in rendering mode in an optimized way which represent yet another advantage of the present invention.

The present invention provides a method of construction and storage of a hierarchical computer graphics data set 100, in computer(s), comprising the steps of:

Providing a number of stored data objects of order between 0 to n 101,104, where data objects of order >0 111,112, 113,114 also have a corresponding hierarchy data, and where at least one of said data objects of order 0 to n has at least three dimensions 115, and where each dimension of each data object has a resolution, Creating hierarchy data that defines new combined data objects of order n+1, where created hierarchy data, for each defined new combined data object of order n+1, comprises references 105,108 to at least lest two arbitrary said data objects of order 0 to n 101,102,103, and also an arbitrary transformation for each referenced data object of order 0 to n, storing all created hierarchy data defining new data objects of order n+1, Creating at least one new data object of order n+1, 109,104, by computing said new data object of order n+1, using said hierarchy data defining corresponding new combined data object of order n+1, and also using data from all referenced data objects of order o to n according to the hierarchy data Storing all computed new data objects of order n+1, 111, wherein said computing includes recreating parts of data from at least two referenced data objects of order 0 to n, and merging said recreated parts, and also removing parts of recreated data.

Furthermore the method of construction and storage can be repeated in order to create data objects of increasing order.

In the described method the resolutions of all objects of order n are lower than or equal to said resolution of all said data objects of order lesser than n.

In this invention at least parts of said data objects can comprise mesh objects having arbitrary number of vertices, and a connectivity of said vertices defining edges between connected pairs of said vertices 603, defined by plural connected edges, and for each said vertex also having attributes such as texture coordinates values, normal coordinates values, material values, or bone weight values, Where said step of recreating parts comprises creating a new mesh for the objects or copying the mesh data, or combinations thereof, 600 and where said merging of claim 1 comprises joining at least two vertices from at least two said mesh objects into one vertex, 601 and said removing parts comprises removing edges from said mesh objects 601.

The said data objects can also comprise image objects having a number of picture elements (pixel) of at least 3 dimensions, such as voxels, and where said merging comprises joining at least two picture elements from at least two different said image objects into one picture element, and said removing of data comprises removing at least one picture element from said image objects.

In this invention a part of said step of computing new data objects can comprise removing at least one dimension from parts of said at least on data objects, including simplifying a 3-dimensional mesh into a 2 dimensional texture or simplifying a 3-dimensional voxel into a 2-dimensional pixel.

In the present invention data objects (comprising mesh objects, or voxel objects, or raster graphics objects, or vector graphics objects, or animations, or sound objects, or physical properties, or combinations thereof), can be approximated with stand in objects where said step of computing new data objects comprises computing new data that is an approximation based on the visual or audial appearance that said defined new combined data object of order n+1 has on a limited space that is localized outside of the space that is occupied by said new combined data object of order n+1.

The transformation for each referenced data object of order 0 to n, comprises arbitrary mathematical transformations, including rotation, shearing, scaling, translation, filtering or any possible combinations thereof.

The creation of hierarchy data that defines new combined data objects of order n+1 is carried out by choosing and combining said referenced data objects of order 0 to n, using a computer graphical user interface (GUI).

The said hierarchical computer graphics data set can be stored as at least one directed acyclic graph 208, 209 being defined by a number of unique leaf nodes, and a number of unique inner nodes each having at least one directed edge, where each unique leaf node 205, 206 store unique data object of order 0 and where each data object of order >0 is stored as a unique inner node 201, 202, 203, 210 and where directed edges 204, 207 of each said unique inner node 201, 202, 203, 210 point to the nodes of lower order according to referenced data objects of order 0 to n in said hierarchy data, and where each directed edge also stores data about the transformation of the referenced data objects of order 0 to n according to said hierarchy data.

The directed acyclic graph can be used in a method further comprising the step of choosing from each one of said directed acyclic graph at least one node together with a corresponding sum of all transformations, said step of choosing comprising sub-steps of walking each said directed acyclic graph recursively through all paths 301, 302, 303 of said directed acyclic graph, starting from all top nodes 307 terminating said recursive walk along each path at some node where said terminating is based on some specific states, and choosing said node, and for each said chosen node calculating the said sum of all transformation data along said each path from the top node of said each path to each said chosen node.

The said specific states can be based on, distance from the camera to the said chosen node, or the incurred visible error of the said chosen node, or the amount of time available for rendering the computer graphics data, or any possible combination thereof.

Furthermore the steps of using said chosen nodes can be used in computer graphics rendering applications, including real-time computer graphics visualization, offline computer graphics rendering, haptics, dynamic simulations, sound simulation, or any possible combinations thereof, wherein each said chosen node is transformed with corresponding said sum of all transformation data and then rendered.

The rendering applications could be distributed and performed individually among at least two computers in a computer network, where said hierarchical computer graphics data set is stored in at least one computer in said network.

DETAILED DESCRIPTION

The present invention comprises a method for the creation and use of computer graphics (CG) data. The term CG shall herein be taken to mean general multimedia rendering of digital CG data or simply CG data. The CG data thus consists of digitally stored information that can be used directly or indirectly by digital hardware for the purpose of multimedia rendering. Examples of CG data that can be used directly for rendering could be sound data or visual graphics data, such as graphics on a display or sound from speakers.

Example of CG data that could be used indirectly for rendering is data that is somehow connected to other multimedia data and used during the rendering of that multimedia data. Such data could for example by physical properties that are used for the dynamics of virtual three dimensional objects in real-time 3D rendering.

The method of the present invention will here be referred to as the Hierarchical Bottom Up (HBU) method FIG. 4. The HBU method is used in the creation of CG data, and the CG data that is created through the HBU method is here referred to as HBU data.

The HBU data, can in a very general form be stored as one or more Directed Acyclic Graphs (DAGs) 208, 209. The DAG terminology is thus defined and used here for a more clear description of the present invention.

In mathematics and computer science, a graph is the basic object of study in graph theory. A graph is a set of objects called vertices or nodes 203, 205, joined by links called edges. Typically, a graph is depicted as a set of dots or squares that represent the nodes joined by lines that represent the edges.

A graph where the edges are directed is called a directed graph or DAG. The directed edges are depicted by arrows 204, 207, where one arrow thus indicates the linking of two nodes and the direction of the link. One node can thus have one or more arrows that either point to or point from the node. (see figure)

In a DAG a directed path defines a particular route between two different nodes, defined through at least one directed edge. For example in FIG. 3 the path from node A 307 to node D 305 has two different directed paths that is A to B to D 303 or A to C to D 302. The size of a directed path is here taken to be the number of edges in that path.

In a DAG the directed edges contain no directed cycles. That means that for any node v, there is no directed path starting and ending on v. DAGs appear in models where it doesn't make sense for a node to have a path to itself; for example, if an edge u to v indicates that v is a part of u, such a path would indicate that u is a part of itself, which is impossible. DAGs can be considered to be a generalization of trees in which certain subtrees can be shared by different parts of the tree. In a tree with many identical subtrees, this can lead to a drastic decrease in space requirements to store the structure.

A node that contains one or more arrows all pointing away from the node is defined as a leaf node 205, 206. A top node containing one or more arrows who all point towards the node is defined as a top node 201, 202, 204. The nodes that are either top or leaf nodes, are referred to as internal nodes 210.

The internal nodes of a DAG are said to have different orders depending on the length of the path from that node to a leaf node. The leaf node is said to have the lowest order in a DAG whereas the top node has the highest order in the DAG. The orders can also be described by numbers where the leaf nodes can for example have order 0 with internal nodes having increasing number of orders 1,2,3 . . .

In the first step of the HBU method, a number of base CG data objects 101, 102, 103 (or simply base data objects) are created. The term data object is here taken to mean a set of digital data that can be used in CG rendering. Each of the said base data objects can consist of any arbitrary form of CG data. Some commonly used data objects today are 2 dimensional (2D) images (that is pictures containing pixels with arbitrary material), or 3 dimensional (3D) images (voxels), or 3D vector objects based on polygons with textures and materials. The base objects can also consist of animations. There are also other types of data objects that can be used in computer graphics such as sound data, haptics data, or data describing physical properties such as gravitation, heat, force, velocity etc. The base data objects could also be possible combinations such as animations of a vector object with a corresponding sound. The base data objects define the leaf nodes of the DAG data that defines HBU data. In the continued description of the current invention each node of a DAG is defined by a CG data object, and thus when referring to a node we shall refer to the data object that is stored at that node.

The base data objects can be created manually, automatically or semi automatically using any appropriate software. The term manually here means that human interaction with a software is needed throughout the entire process, whereas an the term automatic refers to a process that is carried out totally by a computer machine only using a set of predefined parameters, and algorithms.

In a second step the base data objects or the leaf nodes are then combined to form larger and more complex objects. In this combination procedure an arbitrary number of different base data are individually transformed, and merged into new higher order data objects 104 109. The merging or combining of CG data objects shall here be taken to mean that a new data object is created from a number of data objects of lower order, so that the new combined data object contains all of the information that was present in its constituent parts, i.e., the base data objects in this case. The individual transformation of each base data object is here taken to mean a mathematical transformation on the CG data object that is in a sense relevant to make with respect to the nature of the form that the data is to be rendered. For example if the data objects comprise raster or vector graphics, these data objects can be rotated scaled or translated arbitrary and combined together. If the objects comprise for example sound then the sound objects can be individually filtered (for example changing amplitude or frequency filtration) and put together to create new combined sound data objects.

The only constraint put on the character of the base data object is that it should be in such a form that it is possible to combine the base data object with itself and/or with other compatible base data objects and create a combined new data object.

After each combination procedure each combined new data object is simplified 601 using automatic simplification algorithms. The term simplification of data object here is taken to mean that data objects are modified, in such way that the new modified data object represents an approximation to the original unmodified data object. The simplified object has reduced size and takes less storage space, and is also more optimized for rendering as compared to the original non simplified data object.

The resulting simplified object is stored as an internal node 201 or top node 203, here also referred to a stand in nodes. The stand in nodes should be such that the rendering of the stand in nodes could be carried out faster than the rendering of the unmodified combined node, but without a major noticeable difference in the perceived resulting render. In practice this means that the nature of the CG data objects used in the said HBU method should be such that upon their combination the combined object should contain overflows information that no longer is necessarily important when the object is rendered as a whole. Some examples could be three dimensional CG data objects such as vector graphics, where a set of combined objects could contain internal and external topological information that could be removed or simplified in the said simplification procedure since this part of the objects data will not be visible when the combined data object is rendered as a whole. There are today many different simplification algorithms that work specifically on the simplification of three dimensional objects. Such algorithms are generally referred to as Level of Detail algorithms.

Other examples could be the simplification of data objects that contain some physical properties that could be added such as force vectors, in this case the combined data objects could be a set vectors that could be simplified by addition to one resulting added vector.

The most obvious scenario is that the data object simplification is carried out fully automatically by using software that carries out appropriate simplification algorithms.

The format of each of the resulting new simplified combined data object must be such that it shall still be possible to combine the simplified data objects with itself or with other compatible data objects.

Each new simplified combined data object is then stored as an internal node of the HBU DAG data. The directed edges of the internal nodes point to the object or objects that have been combined in order to create the data object at that particular node, i.e., the children of that node.

The HBU method can now be carried out in the same fashion on the present nodes of the DAG. That is all the objects of order 0 i.e. leaf nodes 205, 206 or order 1 can be combined again through transformation of an arbitrary number of objects and simplified as described earlier, and stored as new internal nodes with directed paths containing information about the children and the transformations for each node.

This hierarchical combination process can be carried out in a number of steps in order to create and store new inner nodes of increasingly higher orders.

When the HBU process is completed, the result is an HBU data comprising one or more DAGs that describe a hierarchical CG data object, where each internal node is an approximations to a data object that is created by the combination of the children to that node, with an additional stored information about the transformation of each child stored in that node.

Through careful planning, the HBU data can grow linearly in size, while the apparent total size of the CG scene that the HBU data describes grows exponentially. This is one of the advantages of the HBU method as compared to conventional linear CG data creation methods where the size of the CG data set grows exponentially since objects are not reused.

The final computer graphics data set that is created through the HBU method is directly optimized for rendering, and does not need further optimization steps.

The following procedure describes the method in which the HBU data is to be used in CG rendering.

At rendering time, the DAG/DAGs of the HBU data are walked recursively starting from at least one of the top nodes of a DAG. By walking recursively here we mean that each internal node of the DAG is chosen along all the paths of the DAG starting from all the top nodes.

In the extreme case, each node in the DAG is visited once for each unique directed path to that node from any start node. At the end of each path, the last node is rendered. The rendering is executed after transforming the data object by using the accumulated transformation along that particular path. The accumulated transformation is the calculated sum of all transformations along the path to the node that is being rendered.

As an example in the DAG of FIG. 3 the unique directed paths are A to B to D 303, A to C to D 301, and A to C to E 302, and thus, node D 305 is rendered twice, using the accumulated transformations along paths A to B to D 303, and A to C to D 301, while node E 306 is rendered once, using the accumulated transform along path A to C to E 302.

The art of the rendering depends on the format of the object data at that particular node. For example if the data object comprises 2d or 3d images then rendering refers to displaying the 2d or 3d image after applying the accumulated transformation on the data object. In this case the nature of the transformation could be rotation, scaling and/or translation, and thus the accumulated transformation is the sum of all the transformational parameters along that path. If the data object comprises sound then rendering refers to playing the sound described by the sound object.

The recursive walking of a DAG can however be interrupted/terminated at any node along a path, and no node referenced by that node is then rendered. Instead, the node at which the recursive walking was terminated is rendered as a stand in for the nodes not rendered. A node at which the termination could occur could for example be node C 300 in FIG. 3. In that case the directed paths A to C to D 301 and A to C to E 302 are cut short into only A to C 311. Therefore, in this example, node D 308 is rendered once, using the transformation of path A to B to D, 303 and node C 303 is rendered once, using the transformation of path A to C 311, and node E 316 is not rendered at all.

In another example both node B 309 and node C 310 could be cut short. In this case, node B 309 is rendered once, using the transformation of path A to B 313, and C is rendered once, using the transformation of path A to C 312. In this case neither node D 314 nor node E 315 are visited at all in the process of walking the DAG and thus not chosen for rendering.

Using the stand-ins nodes can greatly reduce the rendering-time of the referenced nodes. However, as they are simplified combinations of the referenced nodes they can only approximate the actual data of the combined referenced nodes. Therefore, measure must be taken to choose which nodes to render using stand-ins (i.e., terminate the recursive walk along a certain path), and which nodes that should be rendered using the actual leaf nodes. The procedure that determines when the recursive walk should end is based on the type of the object data at the present node and the desired type of CG application. In most ideal cases one could think of situations where the rendered CG application is spatially dependent, meaning that the HBU data has a spatial distribution. In this case the measures defining the termination could be based on parameters such as a distance from the camera to the node in the case of three dimensional CG rendering, or the incurred visible error of the stand-in, or the amount of time available for rendering the CG data.

One advantage of the HBU lies in the fact that the data objects are simplified before being used in higher order data object creations. If the simplifications of the data objects are carried out in an optimized way, then the simplified data object contains approximately the same amount of data as only one of the base data objects contains. Using such clever simplification algorithms enables the possibility of working with a combined object data size of an approximately constant size during the HBU creation of a computer graphics scene, independently on the order of the data. As the combined objects are simplified it is also possible to edit the entire HBU scene out-of-core. The reason is that simplification algorithms can produce stand-in nodes for the inner nodes of he the HBU, so that only the nodes that are being edited need to be in primary memory, while other nodes, that only need to be rendered, can be rendered using a stand-in node. This alleviates the strain on the rendering hardware, as well as only requiring a fraction of the memory needed to store all the nodes.

As an inner node has been edited, the simplification algorithms can directly process the node. The stand-in node then replaces the real node. This processing is done in the background, and meanwhile the manual or automatic creator can work on other parts of the dataset.

The total execution of an HBU method can be carried out automatically, manually or semi automatically.

One obvious scenario is that the base data objects are created semi automatically and then combined in software that could be specially designed for the HBU method. This software could contain helping tools such as tools for displaying the DAGs and tools for allowing combination and simplification of nodes. The software could allow the user to automatically simplify objects and manually combine the objects, or even combine the objects in an automatic way.

Note that rendering and changing of DAGs could be carried out simultaneously and or interchangeably. This means that an HBU data could be modified while it is being rendered. The most obvious scenario is that the HBU data is constant during a rendering of the HBU and could be modified in between the rendering, which is probably the case when the HBU data is being created manually/semi automatically, since the user will need to render the HBU data as it is being created.

EXAMPLES

Example 1

An HBU Creation Software for 3D Graphics

A software tool is designed for the creation of HBU data, where a user can import a number of base data objects comprising 3D data objects, that could for example have been created in conventional 3d software such as AutoCad, 3D studio max, or Maya. The user can then start by combining the base 3D objects using special help tools that allows transformation and combination of the objects, where the objects could also be visualized in real-time on the screen during the combination procedure.

When the objects are combined a new combined object is created and that object will automatically be simplified and a new simplified object is created that can be chosen and used in a continued combination procedure. The simplification could be carried out using so called level of detail algorithms, such as GAPS or Qslim, or other suitable 3d object simplification algorithms.

It should also be possible to use non simplified objects in a combination process and simultaneously simplify the object, and then replace them as soon as they are simplified with the simplified version. The software allows at any time that the user chooses a number of objects and combines them to form higher order objects.

The software could also contain visual information on the structure of the created HBU data, such as a graphic visualization of the DAG with each object representing one node. The user should at any time be able to access the objects in the DAG and modify them by removing the nodes or changing the leaf nodes.

The HBU data can be saved in appropriate formats, for further be usage by other runtime systems.

Example 2

The Combination and Simplification of 3D Graphics in Particular

Three dimensional graphic objects can comprise voxels or vector graphics objects with a mesh and texture. These objects can be created in special software such as z-brush, Maya, 3ds max, or be results of sampling. Once the base 3d graphics objects are created they can be combined using a user specific interface that allows to user to interactively select any of the 3d objects and interactively perform operations such as rotation, shearing, or translation on the objects. The graphical user interface can also contain additional tools allowing the user to more easily combine the objects. These tools could be tools that automatically attaches objects at certain points, or allows the user to find edges of objects. The tools could also be more sophisticated such as tools that automatically combine create objects, such as walls, trees, or sand.

A number of 3d objects can be combined to form a larger *3d* object using such a tool. The final combined *3d* object can then be simplified into a new object, that can be reused in further combination in that tool.

Example 3

Building a 3d very Large City Model through Hierarchical Bottom Up Construction

Using the HBU method one can build a very large city, by first creating small parts of materials used in different parts of the houses and streets. These parts are then combined to create a number of elementary building blocks such as windows, parts of walls, chairs, tables, doors, cars, trees, lamp post, or street parts. These building blocks are then used in order to create parts of streets and houses. The houses are then combined to create city blocks, and the city blocks are put together to create an entire city.

The construction of such large models can be carried out manually in real-time because the user uses the simplified versions of the object when combining them into ever large structures. The reusing of objects dramatically decreases the construction time.

Example 4

Rendering the City of Example 3

The data structure of the city model in example 3 can be used by a computer for real time rendering. During real time rendering a scene graph is created by choosing a number objects and their corresponding accumulated transformation for each frame.

The termination along each path should be based on measurements defining whether or not the object at the present node represents a good enough approximation to the original object depending on the distance at which it is being rendered. A number of methods have been suggested for such calculation, based on hierarchical level of detail models (Erikson)

The scene graph is then used by any 3d engine for the purpose of 3d rendering of the data.

Example 5

Combining Height Maps with HBU Data in a Grid

Since each node in the hierarchical data set is unique, they can also be processed and used together with other information outside the hierarchical data set during real-time rendering.

One example could be to use a height map defining a height pattern over a certain preferably large area, together with a hierarchical data set defining a 3d scene on a two dimensional grid, such as a city model.

During rendering each object in the city could then be displaced by an amount defined by the height map at that position. This is possible since the uniqueness of each node would allow one to calculate the position of all the objects in the 2D grid.

This process of combination could be made between a hierarchical city model and a linear height map model, or between a hierarchical city model and a hierarchical height map. In the base of using a hierarchical height map, one could match the resolution of the height map with the order of the hierarchical data in the city model.

The final result of such combination is a large city area that is visualized in real-time ontop of a height map.

Example 6

Combining Sound, 3D and Dynamics in an HBU

The example of combination of several different data sets in real-time rendering could be carried out between a number of different data formats. The preferred but not necessary way would be to use hierarchical data sets for all the different formats.

One scenario could be that several or all of the data sets in different formats have been created simultaneously using the hierarchical bottom up method. For example one could create a hierarchical three dimensional scene, and simultaneously create a hierarchical sound data set and a hierarchical physical scene that are based on the three dimensional scene. The simplification algorithms for each HBU data, during this creation process could contain parameters that are based on the structure of the other HBUs. For example if one creates a building where many objects in the building contain corresponding sound objects, then the simplification algorithms for the sound could consider, Example 7

Combining HBU Data with Procedural Geometry or Texturing

Since all nodes in the hierarchical data set are unique, they can also encode additional information, that can be used to enrich an object with procedural additions or changes to the object, that increases the level of fidelity to the rendering of the object. Examples of such information in 3d graphics environments could involve text on street signs, where different street all contain the same reference to a lower order node, but where additional information is added ontop of the otherwise identical streets, in the form of sign or other unique information. Other examples could involve procedural three dimensional textures, where in that case the nodes in the hierarchical data set could contain information encoding whether or not that part of the object should contain additional information. Examples could be grass objects that could be added as additional information onto the encoded parts of a three dimensional HBU data set.

Example 8

Combining Multiple HBU in Layers as Themes

Multiple HBU data sets could be combined where different HUB data sets could be used in order to encode different parts of a world. One of the HBU:s could encode the base geometry of the world, and another or multiple other HUB:s could encode "themes" to the world, and can be switched in real time.

Example 9

Automatic Production of HBU Data during Real-Time Rendering

A part of a hierarchical HBU data set could be changed during the rendering of the data in real-time. If the change is such that the part of the data that is changed is again changed into a hierarchical set, then the data that is created as a result of the change could be rendered at its lowest order, while automatic simplification algorithms recreate the simplified version of the objects at higher order nodes in the background and simultaneous of the real-time renderer. As higher order objects of the new changed object are created they can be used by the relatime renderer, in order to optimize rendering.

Example 10

Using HBU Data for Production and Rendering of HBU Data on a Network of Computers Hierarchical HBU data sets could be distributed among a number of connected computers. Each computer could then individually carry out rendering on the HBU data such as real-time rendering. The computer network could also be used for the distribution of the simplification algorithms during the creation of the HBU data, where several computers could share the task of simplifying one or more data objects.

As the HBU data changes each computer in the network should update its HBU data set to the most up to date data.

The invention claimed is:

1. A hierarchical bottom-up method of construction and storage of a hierarchical computer graphics data set, the method comprising:
   combining at least two base data objects into at least one combined data object,
   simplifying each one of said at least one combined data object into a simplified combined data object, said simplified combined data object having a reduced memory size with respect to said combined data object,
   storing each one of said simplified combined data objects, and
   storing first data identifying the base data objects used to generate each combined data object and transformations applied to the base data objects to generate each combined data object,
   combining at least two simplified combined data objects into at least one higher order combined data object,
   simplifying each one of said at least one higher order combined data object into a simplified higher order combined data object, said simplified higher order combined data object having a reduced memory size with respect to said higher order combined data object,
   storing each one of said simplified higher order combined data object, and
   storing second data identifying simplified combined data objects used to generate each higher order combined data object and transformations applied to the simplified combined data objects to generate each higher order combined data object,
   wherein the step of simplifying combined data objects and the step of simplifying higher order combined data objects are carried out automatically by a computer.

2. The method according to claim 1, wherein said base data objects comprise raster graphics objects, or vector graphics objects, or animations, or sound objects, or physical properties, or any possible combinations thereof.

3. The method according to claim 1, wherein combining data objects comprises grouping together an arbitrary number of said base data objects, where each one of said base data objects can be used at least one time and where each one of said base data objects can undergo arbitrary transformations, including rotation, shearing, scaling, translation, or filtering or any possible combinations thereof.

4. The method according to claim 1, wherein simplifying combined data objects or simplifying higher order combined data objects comprises modifying the combined data object in such a way that said simplified combined data object or simplified higher order combined data object is renderable based on a portion of the base data objects included in the combined data object or higher order combined data object.

5. The method according to claim 1, wherein said hierarchical computer graphics data set is created in a manual procedure comprising manual choice and combination and data storage of said base data objects into increasing hierarchical order by using a multimedia user interface, or by choosing and combining said base data objects automatically, or by any possible combinations thereof.

6. The method according to claim 1, wherein said hierarchical computer graphics data set is stored in at least one directed acyclic graph comprising unique leaf nodes, where each unique leaf node stores a unique data object of a lowest order, and
   wherein each data object of an order greater than the lowest order is stored as a unique inner node of said directed acyclic graph, and
   wherein directed edges of each said unique inner node store directions pointing to the nodes of a lower order combined to construct that particular said inner node, and
   wherein each one of said directed edges stores the data about the transformation performed on the node pointed to by said directed edge.

7. The method according to claim 6, further comprising identifying at least one node from each directed acyclic graph for rendering at, said identifying including:
   walking each said directed acyclic graph recursively through all paths of said directed acyclic graph, starting from all top nodes,
   terminating said recursive walk along each path at a node based on a characteristic of the node or the rendering, and
   identifying said node, and
   for each said identified node calculating the sum of all transformation data along said each path from the top node of said each path to each said chosen node.

8. The method according to claim 7, wherein said characteristic of the node or the rendering specific are based on one or more of a distance from a camera position to the said identified node, visible error of said identified node, said visible error due to the transformations along the path to said identified node, or the amount of time available for rendering the computer graphics data, or any possible combination thereof.

9. The method according to claim 6, further comprising providing said identified nodes to one or more computer graphics rendering applications, wherein each said identified node is transformed with corresponding said sum of all transformation data and then rendered.

10. The method according to claim 9, wherein said computer graphics rendering applications include real-time computer graphics visualization, offline CG rendering, haptics, dynamic simulations, or sound simulation, or any possible combinations thereof.

11. The method according to claim 9, wherein said computer graphics rendering applications are distributed, said rendering being performed individually among at least two computers in a computer network, wherein each computer stores its own copy of said hierarchical computer graphics data set.

12. The method according to claim 1, wherein said simplified higher order combined data objects are repeatedly combined and simplified, so as to create simplified combined data objects of increasing order after an iteration.

13. The method according to claim 1, wherein simplifying a higher order combined data object based on said higher order combined data object comprises:
   generating a simplified higher order combined data object based on data from all referenced base data objects or referenced combined data objects according to the stored first data, wherein said generating a simplified higher order combined data object comprises:
      recreating parts of data from at least two referenced based data objects or at least two combined data objects;
      merging at least a portion of said recreated parts; and storing the generated simplified higher order combined data object.

* * * * *